United States Patent Office 2,765,314
Patented Oct. 2, 1956

2,765,314

PREPARATION OF ESTERS

Claude J. Schmidle, Moorestown, and Richard C. Mansfield, Riverton, N. J., assignors to Rohm & Haas Company, Philadelphia, Pa., a corporation of Delaware No Drawing. Application May 12, 1954,
Serial No. 429,384

5 Claims. (Cl. 260—294.3)

This invention deals with a process for preparing carboxylic esters of 4-substituted piperidinols.

Synthesis of various 1-alkyl-4-aryl-4-acyloxypiperidines has been reported by several investigators, who reacted arylmagnesium halides or lithium aryls with 1-alkyl-4-piperidones and acylated the resulting product. These esters have been proven to exert an analgesic effect.

We have discovered a simpler and less tedious method for preparing esters of 4-substituted piperidinols. We utilize the reaction products obtained by reacting together a monovinylidene compound particularly an unsaturated hydrocarbon having a $CH_2=C=$ group, the second carbon atom of which is attached to another carbon carrying a hydrogen atom, formaldehyde, and a primary amine hydrohalide. As is shown by Hartough et al. in U. S. Patent 2,647,117, the reaction of such olefins, formaldehyde, and primary amines leads to tetrahydro 1,3-oxazines. Thus α-methylstyrene yields 6-methyl-6-phenyltetrahydro-1,3-oxazines; α-ethylstyrene yields 6-ethyl-6-phenyltetrahydro-1,3-oxazines; diisobutylene leads to 6-methyl-6-(2,2-dimethyl propyl)tetrahydro-1,3-oxazine; etc. The substituent attached to the nitrogen is dependent upon the primary amine selected as starting material, for example, methylamine giving tetrahydro-oxazines having a 3-methyl substituent, hexylamine giving oxazines having a 3-hexyl substituent; benzylamine giving oxazines with 3-benzyl substituent, cyclohexylamine giving oxazines with a 3-cylohexyl substituent, and allylamine giving oxazines with a 3-allyl substituent. As the reaction of olefin, formaldehyde, and primary amine is usually run, the chief product is a 6-alkyltetrahydro-1,3-oxazine. The presence of formaldimines or other incidental reaction products is possible, but these would in no way interfere with the reaction we have discovered. It may well be that such various by-products can also enter into the series of reactions we use and be at least in part converted to the desired esters.

We have discovered that when the reaction products in basic form resulting from reacting olefin, formaldehyde, and primary amine in the presence of a hydrohalide and neutralization of the salts formed are heated with an anhydride of a carboxylic acid in the presence of a strong inorganic acid, there result carboxylic esters of 4-substituted piperidinols. Heating is effected between 75° and 175° C. The reaction mixture is desirably stirred while it is heated. Acid catalyst and anhydride are removed, conveniently with water and with the aid of aqueous alkaline reagents. The basic ester is then liberated and is isolated and may be purified by conventional steps; such as distillation, or by conversion to the hydrochloride which can readily be recrystallized.

As acid catalyst there is used sulfuric acid or a benzenesulfonic acid or alkanesulfonic acid. The amount of acid used as catalyst may be about 0.1% to 5% of the weight of the basic starting material. A range of 0.25% to one percent is generally best.

Acid anhydride is used in an amount at least equivalent to the basic starting material. It may be used alone or in conjunction with the corresponding carboxylic acid, which may serve as a convenient solvent. Inert organic solvents may also be used, such as benzene or toluene.

As acid anhydrides, there may be used acetic anhydride, propionic anhydride, butyric anhydride, benzoic anhydride, or anhydrides of other carboxylic acids, including polycarboxylic anhydrides, such as succinic anhydride.

Esters of unsaturated acids may also be prepared, as by using acrylic anhydride. Acyl halides may be used in the place of acid anhydrides but with less clean-cut results.

Typical procedures are shown in the following illustrative examples wherein parts are expressed as parts by weight.

*Example 1*

(a) A mixture of 280 parts of methylamine hydrochloride, 800 parts of aqueous 37% formaldehyde solution, and 416 parts of α-methylstyrene was stirred and heated carefully until an exothermic reaction occurred. The reaction mixture was held at 90° to 100° C. with stirring for 1.5 hours. It was cooled, extracted with benzene to leave a solution of the reaction products in salt form, and then treated with aqueous 25% sodium hydroxide solution to render the mixture alkaline and liberate basic products. An organic layer formed. It was taken up with benzene. The benzene extract was separated, dried over anhydrous potassium carbonate, filtered, and stripped of benzene by heating under reduced pressure to give 588 parts of reaction product, containing chiefly 3,6-dimethyl-6-phenyltetrahydro-1,3-oxazine.

(b) There were mixed 150 parts of this product, 2 parts of sulfuric acid and 300 parts of propionic anhydride. This mixture was stirred and heated at 95°–100° C. for about three hours and allowed to stand for 16 hours with cooling to about 30° C. The reaction mixture was mixed with 500 parts of water. Benzene was added to assist in separation of the organic material, two portions each of about 160 parts being used for extracting. The benzene solution was dried over potassium carbonate and distilled after the solvent was removed, the residue was fractionally distilled. At 115–117° C./0.75 mm. a fraction of 31 parts was taken which corresponded in composition to 1-methyl-4-phenyl-4-propionoxypiperdine. It has a neutral equivalent of 247 (theory 247), a refractive index, $n_D^{24}$, of 1.5170, and contained by analysis 73.16% of carbon, 8.58% of hydrogen, and 5.80% of nitrogen (theory gives 72.84% of carbon, 8.56% of hydrogen, and 5.66% of nitrogen).

A portion of the ester was treated with about the theoretical amount of hydrochloric acid to form the piperidine hydrochloride, which melted at 182–183° C.

*Example 2*

There were mixed 61 parts of the reaction product obtained from α-methylstyrene, formaldehyde, and methylamine hydrochloride, as above, 300 parts of acetic anhydride, and 2 parts of 98% sulfuric acid. This mixture was stirred and heated under reflux for 10 hours. The reaction mixture was cooled, and poured into 300 parts of water to dissolve the salt form of the product. The aqueous mixture was extracted with benzene. The water layer was then made basic with ammonium hydroxide to liberate the basic reaction products. These were extracted with benzene. The benzene layer was separated, dried over potassium carbonate, and stripped of solvent under reduced pressure. The residue thus obtained was fractionally distilled. At 107–110° C./0.7 mm. a fraction of 18 parts was obtained which was 1-methyl-4-phenyl-4-acetoxypiperidine. The distilled product became crystalline and was recrystallized from heptane. It then melted at 62–64° C. It had a neutral equivalent of 233 (theory 233) and contained by analysis about the correct percentages of carbon, hydrogen and nitrogen for this compound. The hydrochloride was formed and was found to melt at 212–213° C.

Substitution of benzoic anhydride for acetic anhydride yielded 1-methyl-4-phenyl-4-benzoxypiperidine, which when treated with hydrochloric acid and crystallized in the form of the hydrochloride melted at 214–215° C.

In the same way esters of piperidinols are formed by starting with propene, butene, isobutylene, diisobutylene, or the like. Reaction of these olefins with formaldehyde and a primary amine in the presence of a hydrogen halide yields nitrogenous products, chiefly the tetrahydro-1,3-oxazines, the reaction products being converted to their basic form and then reacted with a carboxylic anhydride in the presence of sulfuric acid as catalyst. There is thus formed, for example, 1-methyl-4-acetoxypiperidine, 1,4-dimethyl-4-acetoxypiperidine, 1,4-dimethyl-4-propionoxypiperidine, etc.

The above procedures were repeated with use of a butanesulfonic acid as catalyst in place of sulfuric acid with very similar results. Toluenesulfonic acid may likewise be used in the same way.

Example 3

The above procedure was followed with substitution of butyric anhydride. There was formed 1-methyl-4-phenyl-4-butyroxypiperidine, which was treated with hydrogen chloride to form the hydrochloride thereof. It melted at 192–193° C. The free base is isolated upon neutralization of the hydrochloride.

Example 4

The above procedures were followed starting with α-methylstyrene, formaldehyde, and n-propylamide. The basic reaction products were reacted with propionic anhydride in the presence of about one percent of sulfuric acid. There was obtained 1-n-propyl-4-phenyl-4-propionoxypiperidine, which was converted with hydrogen chloride to the hydrochloride. This compound was crystallized and melted at 218–219° C. The free base may be obtained again upon neutralization of the hydrochloride.

Example 5

The procedure of Example 4 was followed with substitution of isopropylamine for the previously used amine. There was isolated in mediocre yield 1-isopropyl-4-phenyl-4-propionoxypiperidine. It formed a hydrochloride which melted at 220–221° C.

Example 6

In place of the above propylamines there was used allylamine. The reaction product of this amine, formaldehyde, and α-methylstyrene was reacted as above with propionic anhydride, to give 1-allyl-4-phenyl-4-propionoxypiperidine, which was separated as the crystalline hydrochloride, which melted at 190–191° C.

Example 7

The same procedure was followed starting with butylamine, formaldehyde, and α-methylstyrene. The basic reaction products were reacted with butyric anhydride in the presence of sulfuric acid. The product was isolated as the hydrochloride of 1-butyl-4-phenyl-4-butyroxypiperidine, which melted at 206–207° C. Acetic anhydride was used in place of the above butyric anhydride. The product was 1-butyl-4-phenyl-4-acetoxypiperidine. Its hydrochloride melted at 207–208° C.

Example 8

In the same way ethylamine, formaldehyde, and α-methylstyrene were reacted. The resulting products, chiefly 3-ethyl-6-phenyl-6-methyl-tetrahydro-1,3-oxazine, were reacted with propionic anhydride in the presence of sulfuric acid as catalyst. There was isolated 1-ethyl-4-phenyl-4-propionoxypiperidine, which was converted to its hydrochloride melting at 194–195° C.

Example 9

Benzylamine was used in the place of the above amines and the oxazine-containing products were reacted with propionic anhydride as above. The product formed was 1-benzyl-4-phenyl-4-propionoxypiperidine, which was isolated as its hydrochloride, melting at 210–211° C.

Example 10

The above procedures were followed starting with methylamine, formaldehyde, and α-ethylstyrene. The resulting reaction products were reacted with propionic anhydride as above. The product was 1,3-dimethyl-4-phenyl-4-propionoxypiperidine, the hydrochloride of which melts at 214–215° C.

The starting materials which are used are formaldehyde, a primary amine, $RNH_2$, and an olefinically unsaturated hydrocarbon having a vinylidene group with a hydrogen-bearing carbon atom,

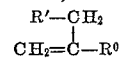

where R is alkyl, alkenyl, aralkyl, or cycloalkyl, R' is hydrogen or methyl, and R° is alkyl or aryl. In preferred forms R is an alkyl group of not over six carbon atoms, cyclohexyl, or benzyl. But the alkenyl group, typified by allyl, methallyl, crotyl, undecenyl, and dodecenyl, also provides a series of products with distinctive characteristics. The alkenyl group desirably contains not over 12 carbon atoms. R° is preferably an alkyl group such as methyl, ethyl, 2,2-dimethylpropyl, such groups containing up to six carbon atoms, or phenyl, including phenyl groups with neutral substituents, but it may also be naphthyl.

As acid anhydride, there is preferably used a carboxylic acid anhydride of the structure

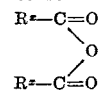

where $R^x$ is an alkyla group up to four carbon atoms, particularly methyl, ethyl, or propyl, or phenyl in the preferred aspects of this invention.

After reaction of amine $RNH_2$, formaldehyde, and olefinic hydrocarbon in the presence of a hydrogen halide and separation of the reaction products in basic form, these reaction products are reacted with a carboxylic anhydride in the presence of sulfuric acid or a sulfonic acid as catalyst to form an ester of a 4-substituted piperidinol. These esters are useful pharmaceutical agents, having been shown to be powerful analgesics.

We claim:

1. A process for preparing carboxylic esters of 4-hydroxypiperidines which comprises reacting the condensate of formaldehyde, an amine $RNH_2$, and an olefinic hydrocarbon

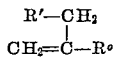

obtained by reacting these materials in the presence of a hydrogen halide and separating the resulting reaction products in basic form with a carboxylic anhydride, $(R^xCO)_2O$, at a temperature between 75° and 175° C. and in the presence of an acid from the class consisting of sulfuric acid, benzenesulfonic acids, and alkanesulfonic acids as catalysts, and separating an ester of the structure

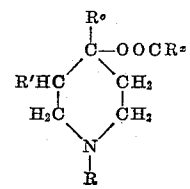

where R is a member of the class consisting of alkyl groups of not over four carbon atoms, allyl, benzyl, and cyclohexyl groups, R' is a member of the class consisting of hydrogen and the methyl group, R° is a member of the class consisting of alkyl groups of not over six carbon atoms and the phenyl group, and $R^x$ is a member of the class consisting of lower alkyl groups and the phenyl group.

2. A process for preparing carboxylic esters of 4-hydroxypiperidines which comprises reacting the condensate of formaldehyde, an amine $RNH_2$, and α-methylstyrene obtained by reacting these together in the presence of a hydrogen halide and separating the resulting reaction products in basic form with a carboxylic anhydride, $(R^xCO)_2O$, at a temperature between 75° and 175° C. and in the presence of sulfuric acid as catalyst, and separating an ester of the structure

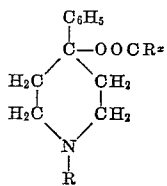

where R is a member of the class consisting of alkyl groups of not over four carbon atoms, allyl, benzyl, and cyclohexyl groups, and $R^x$ is a member of the class consisting of lower alkyl groups and the phenyl group.

3. A process for preparing 1-methyl-4-phenyl-4-propionoxypiperidine which comprises reacting the condensate of formaldehyde, methylamine, and α-methylstyrene obtained by reacting these in the presence of hydrogen chloride and separating the resulting reaction products in basic form with propionic anhydride in the presence of sulfuric acid as catalyst at a temperature between 75° and 175° C. and separating the said 1-methyl-4-phenyl-4-propionoxypiperidine.

4. A process for preparing 1-methyl-4-phenyl-4-acetoxypiperidine which comprises reacting the condensate of formaldehyde, methylamine, and α-methylstyrene obtained by reacting these in the presence of hydrogen chloride and separating the resulting reaction products in basic form with acetic anhydride at a temperature between 75° and 175° C. and in the presence of sulfuric acid as catalyst, and separating the said 1-methyl-4-phenyl-4-acetoxypiperidine.

5. The process of preparing 1,3-dimethyl-4-phenyl-4-propionoxypiperidine which comprises reacting the condensate of α-ethylstyrene, formaldehyde, and methylamine obtained by reacting these in the presence of hydrogen chloride and separating the resulting products in basic form with propionic anhydride at a temperature between 75° and 175° C. and in the presence of sulfuric acid as catalyst, and separating the said 1,3-dimethyl-4-phenyl-4-propionoxypiperidine.

References Cited in the file of this patent
UNITED STATES PATENTS 2,647,117    Hartough _____ July 28, 1953